(12) United States Patent
Bauman et al.

(10) Patent No.: US 6,643,724 B2
(45) Date of Patent: Nov. 4, 2003

(54) METHOD AND APPARATUS FOR INTERRUPT ROUTING OF PCI ADAPTERS VIA DEVICE ADDRESS MAPPING

(75) Inventors: Ellen Marie Bauman, Rochester, MN (US); David Lee Dosch, Rochester, MN (US); Daniel Paul Wetzel, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 470 days.

(21) Appl. No.: 09/748,980

(22) Filed: Dec. 27, 2000

(65) Prior Publication Data

US 2002/0083258 A1 Jun. 27, 2002

(51) Int. Cl.[7] .............................................. G06F 13/24
(52) U.S. Cl. ......................................... 710/260; 710/48
(58) Field of Search ................................ 710/260–269, 710/48–51; 712/244

(56) References Cited

U.S. PATENT DOCUMENTS

| 5,771,387 | A | * | 6/1998 | Young et al. | ................ | 710/260 |
| 5,913,045 | A | * | 6/1999 | Gillespie et al. | ............. | 710/311 |
| 6,141,703 | A | * | 10/2000 | Ding et al. | .................... | 710/10 |

* cited by examiner

*Primary Examiner*—Sumati Lefkowitz
(74) *Attorney, Agent, or Firm*—Joan Pennington

(57) ABSTRACT

A method and apparatus are provided for interrupt routing of peripheral component interconnect (PCI) adapters via device address mapping. A first processor complex includes a multifunction PCI to PCI bridge interface chip. A local PCI bus is coupled between a second processor complex and the multifunction PCI to PCI bridge interface chip. A host PCI bus is coupled between the multifunction PCI to PCI bridge interface chip and a second multifunction PCI to PCI bridge chip. A plurality of local area network (LAN) adapters are coupled to the second multifunction PCI to PCI bridge chip. The multifunction PCI to PCI bridge interface chip of the first processor complex includes interrupt mapping logic for mapping interrupts from the LAN adapters to PCI interrupts on the local PCI bus to the second processor complex. The multifunction PCI to PCI bridge interface chip of the first processor complex includes translation logic for translating a configuration cycle on the local PCI bus from the second processor complex to another configuration cycle on the host PCI bus and for translating a configuration cycle on the host PCI bus from the LAN adapters to another configuration cycle on the local PCI bus to the second processor complex. The multifunction PCI to PCI bridge interface chip of the first processor complex includes a bus number register for specifying a PCI bus number and a device translation register for specifies a translation value for each function of the multifunction PCI to PCI bridge interface chip for determining a device number of each of said plurality of local area network (LAN) adapters.

12 Claims, 6 Drawing Sheets

| FUNCTION INTERFACE CHIP 114 | DESIRED PCI INTERRUPT | BUS DEVICE NUMBER REQUIRED FOR INTERRUPT |
|---|---|---|
| FUNCTION 2 | C | BUS 1 DEVICE 2 |
| FUNCTION 3 | D | BUS 2 DEVICE 3 |
| FUNCTION 4 | D | BUS 3 DEVICE 3 |

FIG. 3

| PROC 130 TO CHIP 114 FUNCTION/ DEVICE NUMBER | BITS 15:11 VALUE | NEEDED TRANSLATION VALUE (ADD WITH NO CARRY) | RESULTING BITS 15:11 VALUE ON HOST PCI BUS 124 | HOST DEVICE NUMBER |
|---|---|---|---|---|
| F2 DEVICE 2 | 0x00010 | 0x111111 | 0x00001 | 1 |
| F3 DEVICE 3 | 0x00011 | 0x111110 | 0x00001 | 1 |
| F4 DEVICE 3 | 0x00011 | 0x111110 | 0x00001 | 1 |

FIG. 4

BIT
BREAKDOWN

MSB(31)  NAME  DESCRIPTION  TYPE

LSB(00)

| Bits | Name | Description | Type |
|---|---|---|---|
| 31:24 | FUNCTION 2 BUS NUMBER | THIS IS THE BUS NUMBER THAT WILL BE PLACED ON THE HOST BUS FOR A TYPE 1 CONFIGURATION CYCLE FROM LOCAL BUS FUNCTION 2 | R/W |
| 23:16 | FUNCTION 3 BUS NUMBER | THIS IS THE BUS NUMBER THAT WILL BE PLACED ON THE HOST BUS FOR A TYPE 1 CONFIGURATION CYCLE FROM LOCAL BUS FUNCTION 3 | R/W |
| 15:8 | FUNCTION 4 BUS NUMBER | THIS IS THE BUS NUMBER THAT WILL BE PLACED ON THE HOST BUS FOR A TYPE 1 CONFIGURATION CYCLE FROM LOCAL BUS FUNCTION 4 | R/W |
| 7:0 | HOST TO LOCAL TRANSLATE | THESE BITS WILL BE ADDED TO THE BUS NUMBER FOR ANY TYPE 1 CONFIGURE CYCLE PASSED FROM THE HOST TO THE LOCAL BUS | R/W |

FIG. 5

| BIT BREAKDOWN MSB(31) LSB(00) | NAME | DESCRIPTION | TYPE |
|---|---|---|---|
| 31:24 | FUNCTION 2 DEVICE NUMBER | ADD WITH NO CARRY BITS 31:27 TO BITS 15:11 OF THE ADDRESS OF THE TYPE 1 CONFIGURE CYCLE BEING PASSED FROM THE LOCAL BUS TO THE HOST BUS. THIS WILL TRANSLATE THE DEVICE SELECTION FIELD ALLOWING ANY IDSEL TO BE USED<br>WHEN THE IOA IS CHIP 102, THE RESULT OF THIS ADD MUST BE 0001b, SINCE THE IDSEL WIRED TO THE IOA UNDER BRIDGE CHIP 102 IS AD BIT 17 | R/W |
| 23:16 | FUNCTION 3 DEVICE NUMBER | ADD WITH NO CARRY BITS 23:19 TO BITS 15:11 OF THE ADDRESS OF THE TYPE 1 CONFIGURE CYCLE BEING PASSED FROM THE LOCAL BUS TO THE HOST BUS. THIS WILL TRANSLATE THE DEVICE SELECTION FIELD ALLOWING ANY IDSEL TO BE USED<br>WHEN THE IOA IS CHIP 102, THE RESULT OF THIS ADD MUST BE 0001b, SINCE THE IDSEL WIRED TO THE IOA UNDER BRIDGE CHIP 102 IS AD BIT 17 | R/W |
| 15:8 | FUNCTION 4 DEVICE NUMBER | ADD WITH NO CARRY BITS 15:11 TO BITS 15:11 OF THE ADDRESS OF THE TYPE 1 CONFIGURE CYCLE BEING PASSED FROM THE LOCAL BUS TO THE HOST BUS. THIS WILL TRANSLATE THE DEVICE SELECTION FIELD ALLOWING ANY IDSEL TO BE USED<br>WHEN THE IOA IS CHIP 102, THE RESULT OF THIS ADD MUST BE 0001b, SINCE THE IDSEL WIRED TO THE IOA UNDER BRIDGE 102 IS AD BIT 17 | R/W |
| 7:0 | RESERVED | RESERVED=0b | R |

FIG. 6

METHOD AND APPARATUS FOR INTERRUPT ROUTING OF PCI ADAPTERS VIA DEVICE ADDRESS MAPPING

FIELD OF THE INVENTION

The present invention relates generally to the data processing field, and more particularly, relates to a method and apparatus for interrupt routing of peripheral component interconnect (PCI) adapters via device address mapping.

DESCRIPTION OF THE RELATED ART

In conventional PC server arrangements, local area network (LAN) adapters reside directly under a peripheral component interconnect (PCI) bus attached to the microprocessor.

New requirements are presented in a PC server arrangement where LAN adapters do not reside directly under a peripheral component interconnect (PCI) bus attached to the microprocessor, for example, instead residing behind separate buses under multiple PCI to PCI bridges. The PCI rules require that the adapter interrupt signal from behind a PCI to PCI bridge be routed to one of the signals INT A, INT B, INT C or INT D based on the PCI device number. Also it is desirable that PCI interrupts are not shared among multiple I/O adapters.

In order for the PC to map the adapters to known Interrupts and to have the LAN adapters always appear as constant known Bus/Device Numbers, a configurable way of having the device appear at a known location on the PCI bus is required. A need exists for an improved method and apparatus for interrupt routing of peripheral component interconnect (PCI) adapters.

SUMMARY OF THE INVENTION

A principal object of the present invention is to provide a method and apparatus for interrupt routing of peripheral component interconnect (PCI) adapters via device address mapping. Other important objects of the present invention are to provide such a method and apparatus for interrupt routing of peripheral component interconnect (PCI) adapters via device address mapping substantially without negative effect and that overcome many of the disadvantages of prior art arrangements.

In brief, a method and apparatus are provided for interrupt routing of peripheral component interconnect (PCI) adapters via device address mapping. A first processor complex includes a multifunction PCI to PCI bridge interface chip. A first local PCI bus is coupled between a second processor complex and the multifunction PCI to PCI bridge interface chip. A second host PCI bus is coupled between the multifunction PCI to PCI bridge interface chip and a second multifunction PCI to PCI bridge chip. A plurality of peripheral component interconnect (PCI) adapters are coupled to the second multifunction PCI to PCI bridge chip. The multifunction PCI to PCI bridge interface chip of the first processor complex includes interrupt mapping logic for mapping interrupts from the PCI adapters to PCI interrupts on the local PCI bus to the second processor complex.

In accordance with features of the invention, the multifunction PCI to PCI bridge interface chip of the first processor complex includes translation logic for translating a configuration cycle on the first local PCI bus from the second processor complex to another configuration cycle on the second host PCI bus and for translating a configuration cycle on the second host PCI bus from the PCI adapters to another configuration cycle on the first local PCI bus to the second processor complex. The multifunction PCI to PCI bridge interface chip of the first processor complex includes a bus number register for specifying a PCI bus number and a device translation register for specifies a translation value for each function of the multifunction PCI to PCI bridge interface chip for determining a device number of each of the plurality of PCI adapters.

BRIEF DESCRIPTION OF THE DRAWINGS

The present invention together with the above and other objects and advantages may best be understood from the following detailed description of the preferred embodiments of the invention illustrated in the drawings, wherein:

FIG. 3 is a diagram illustrating functions of the multifunction PCI to PCI bridge interface chip of the computer system of FIG. 1 for exemplary interrupt routing of peripheral component interconnect (PCI) adapters via device address mapping in accordance with the preferred embodiment;

FIG. 4 is a diagram illustrating translation values for the functions of FIG. 3 for exemplary interrupt routing of peripheral component interconnect (PCI) adapters via device address mapping in accordance with the preferred embodiment;

FIG. 5 is a diagram illustrating host configure bus number translation values for the functions of FIG. 3 for exemplary interrupt routing of peripheral component interconnect (PCI) adapters via device address mapping in accordance with the preferred embodiment; and FIG. 6 is a diagram illustrating host configure device selection translation values for the functions of FIG. 3 for exemplary interrupt routing of peripheral component interconnect (PCI) adapters via device address mapping in accordance with the preferred embodiment.

DETAILED DESCRIPTION OF THE PREFERRED EMBODIMENTS

Figure 1:
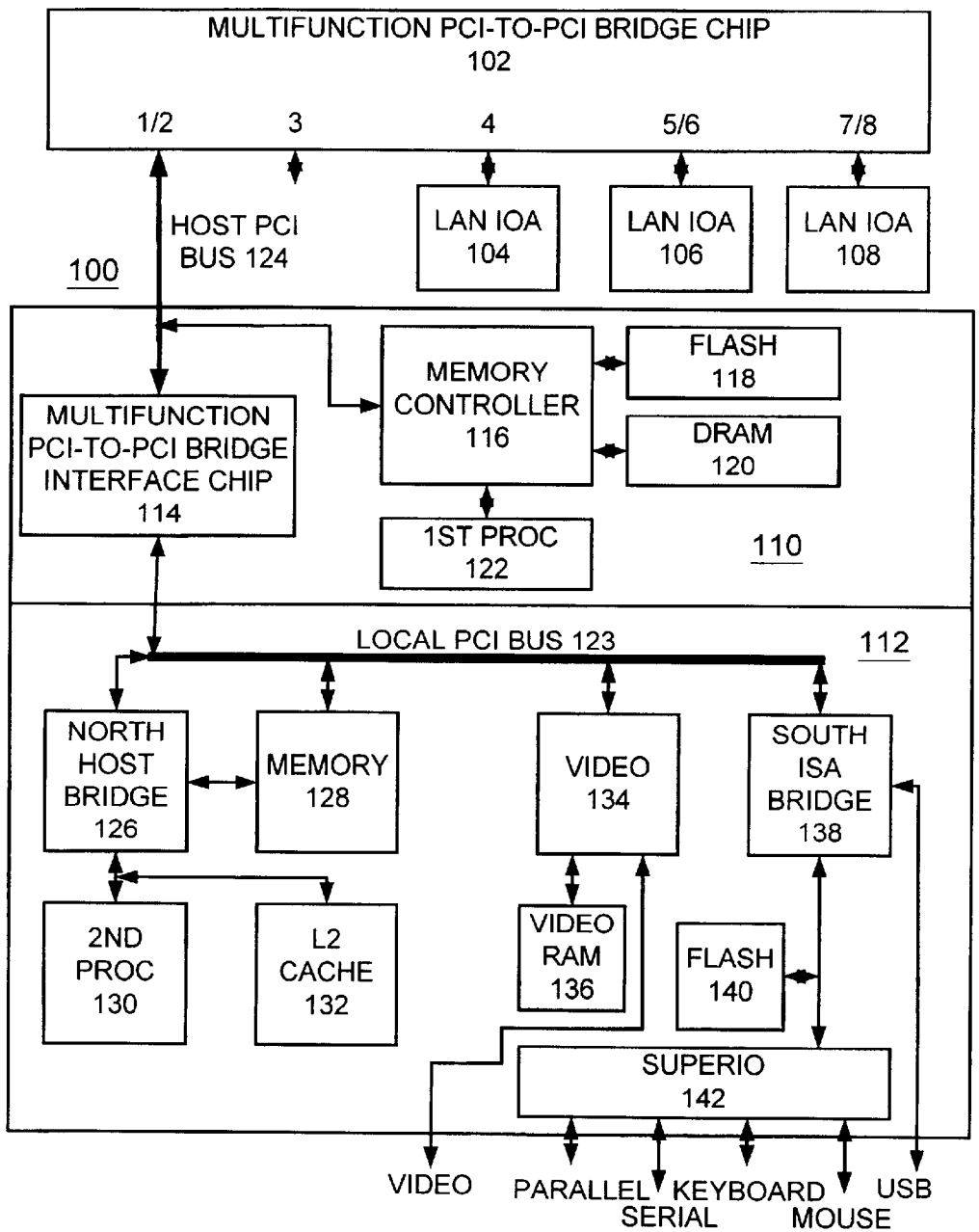
FIG. 1 is a block diagram representation illustrating a computer system for implementing methods for interrupt routing of peripheral component interconnect (PCI) adapters via device address mapping in accordance with the preferred embodiment.

Having reference now to the drawings, in FIG. 1, there is shown a computer or data processing system of the preferred embodiment generally designated by the reference character 100. As shown in FIG. 1, computer system 100 includes a multifunction peripheral component interconnect (PCI) to PCI bridge chip 102 coupled to a plurality of local area network (LAN) input/output adapters (IOAs) 104, 106 and 108. Multifunction PCI to PCI bridge chip 102 is coupled to a first processor complex 110. First processor complex 110 is an input/output processor (IOP) and interface complex. A second processor complex 112 is coupled to the multifunction PCI to PCI bridge chip 102 via a multifunction PCI to PCI bridge interface chip 114 within the first processor complex 110. Second processor complex 112 is a PC complex.

First processor complex 110 includes a memory controller 116 coupled to a plurality of memory devices including a flash memory 118 and a dynamic random access memory (DRAM) 120. A first processor 122, such as an IBM Power PC processor, is coupled to the memory controller 116.

A first local peripheral component interconnect (PCI) bus 123 is connected between the multifunction PCI to PCI bridge interface chip 114 and the second processor complex 112. A second host peripheral component interconnect (PCI) bus 124 is connected between the multifunction PCI to PCI bridge interface chip 114 and the multifunction PCI to PCI bridge chip 102.

Second processor complex 112 includes a north host bridge 126 coupled to local PCI bus 123, a memory 128, a second processor 130 and an L2 cache 132. A video controller 134 coupled to a video port and a video random access memory (RAM) 136 is coupled to the local PCI bus 123. Second processor complex 112 includes a south host bridge 138 coupled to local PCI bus 123, and coupled to a USB port, a flash memory 140 and a super IO 142 coupled to a parallel port, a serial port, a keyboard, and a mouse. Second processor 130 is, for example, an Intel Pentium processor device.

Figure 2:
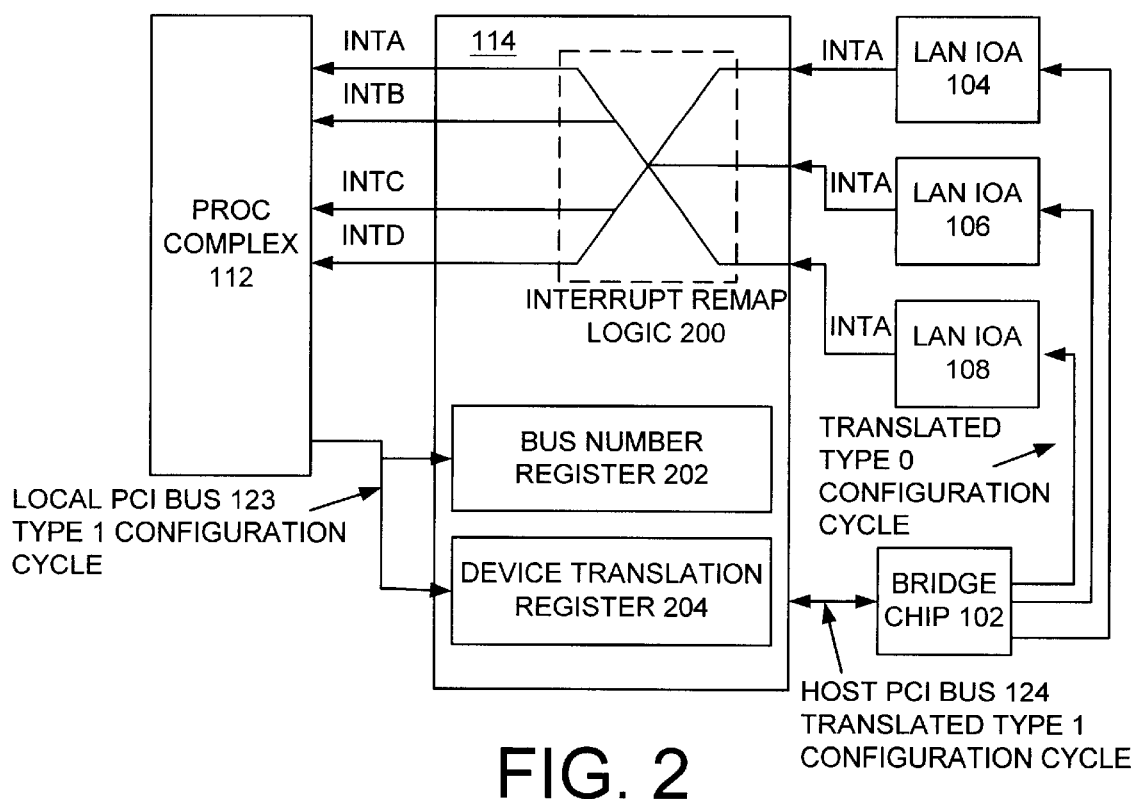
FIG. 2 is a block diagram representation illustrating a multifunction PCI to PCI bridge interface chip of the computer system of FIG. 1 for exemplary interrupt routing of peripheral component interconnect (PCI) adapters via device address mapping in accordance with the preferred embodiment.

Referring to FIG. 2, the multifunction PCI to PCI bridge interface chip 114 is shown in more detail with the second processor complex 112 and LAN IOAs 104,106 and 108. Multifunction PCI to PCI bridge interface chip 114 includes an interrupt remap logic 200, a bus number register 202 and a device translation register 204. The interrupts from the LAN adapters 104, 106 and 108, shown an INT A, are configured to appear on any of the PCI interrupts A-D to the local PCI bus 123 via the interrupt remap logic 200. Bus number register 202 provides a bus number, for example, to be placed on the host PCI bus 124. The device translation register 204 provides a translation for predetermining which device numbers the LAN adapters 104, 106 and 108 appear as to the second processor 130.

In accordance with features of the preferred embodiment, multifunction PCI to PCI bridge interface chip 114 is implemented with the ability to translate a Type 1 PCI configuration cycle, into another Type 1 PCI configuration cycle on its secondary host PCI bus, such as PCI bus 124, that correctly finds a particular LAN adapter 104, 106, or 108 under the separate multifunction PCI to PCI bridge chip 102. There are two steps in this process.

First, in the multifunction PCI to PCI bridge interface chip 114 configuration space, multifunction PCI to PCI bridge interface chip 114 provides the bus number register 202 that specifies the bus number to be placed on the PCI host bus 124 in the event of a Type 1 PCI configuration cycle that matches the bus number range behind that particular function of multifunction PCI to PCI bridge interface chip 114. The bus number register 202 provides, for example, 8 bits for each of three functions of multifunction PCI to PCI bridge interface chip 114 that appear as PCI to PCI bridges. A host configuration bus number translation is illustrated and described with respect to FIG. 5.

Second, multifunction PCI to PCI bridge interface chip 114 provides the device translation register 204 that specifies a translation for each function by adding the translation value to the incoming Type 1 configuration cycle's device number. This predetermines which device numbers of the LAN adapters 104, 106 and 108 connected under the multifunction PCI to PCI bridge chip 102 appear to the second processor 130, and when a configuration cycle is sent to that device from the processor 130, the appropriate configuration cycle appears on the host PCI bus 124. A host configuration device selection translation is illustrated and described with respect to FIG. 6.

In addition, multifunction PCI to PCI bridge interface chip 114 provides interrupt mapping logic 200 for mapping the interrupts from the LAN adapters 104, 106 and 108 to the local PCI bus 123, such that the interrupts can be configured to appear on any of the PCI interrupts A-D. This is achieved, for example, by routing the interrupt inputs from the LAN adapters 104, 106 and 108 into general purpose IOs (GPIOs) on the multifunction PCI to PCI bridge interface chip 114 and then through a set of GPIO configuration registers routing the interrupt inputs from the LAN adapters to the appropriate PCI interrupts on the local PCI bus 123.

In accordance with features of the preferred embodiment, multifunction PCI to PCI bridge interface chip 114, for example, presents itself to the second processor local PCI bus 123 as a five function device. Functions 0 and 1 are dedicated in INT A and INT B, respectively. For example, the LAN IOAs 104, 106 and 108 under the multifunction PCI to PCI bridge chip 102 can share INT C and INT D. Then, for example, the IOAs corresponding to function 2 of the multifunction PCI to PCI bridge interface chip 114 can be mapped to INT C and the IOAs corresponding to functions 3 and 4 can be mapped to INT D. With the LAN adapters 104, 106 and 108 plugged under the multifunction PCI to PCI bridge chip 102 in PCI bus numbers 40, 50 and 70 and the IDSEL for all three slots is AD bit 17, requires that address bits 15:11 of the configuration cycle equal 0001 b.

FIG. 3 illustrates exemplary functions of the multifunction PCI to PCI bridge interface chip 114 for exemplary interrupt routing of peripheral component interconnect (PCI) adapters via device address mapping in accordance with the preferred embodiment. The exemplary functions convert a configuration cycle from the second processor 130 to the LAN IOA 104, 106 or 108. As shown, IOAs corresponding to function 2 of the multifunction PCI to PCI bridge interface chip 114 are mapped to PCI INT C together with bus device number required for the interrupt of bus 1 device 2. The IOAs corresponding to functions 3 and 4 are mapped to PCI INT D with bus 2 device 3 and bus 3 device 3, respectively. A resulting Type 0 configuration cycle to each LAN IOA 104, 106 and 108 selects IDSEL 17.

FIG. 4 illustrates translation values for the functions of the multifunction PCI to PCI bridge interface chip 114 for exemplary interrupt routing of peripheral component interconnect (PCI) adapters via device address mapping in accordance with the preferred embodiment. For the device translation, to translate bits 15:11 to the expected value of 00001 b, the translation value for each of the functions are shown.

In accordance with features of the preferred embodiment, the ability to translate bus device numbers between the PCI host bus 124 and the PCI local bus 123, enables the bus device numbers to appear to the second processor 130 at a known value, and the ability to route adapter interrupts via adapter interrupt logic 200 enables the required processor 130 PCI bus interrupt. The LAN IOAs 104, 106, and 108 appear on the processor 130 PCI bus 123 at the desired interrupt device values.

FIG. 5 illustrates host configure bus number translation values for the functions of the multifunction PCI to PCI bridge interface chip 114 for exemplary interrupt routing of peripheral component interconnect (PCI) adapters via device address mapping in accordance with the preferred embodiment. FIG. 5 shows an exemplary bit breakdown for a mask used to translate configure bus numbers between the local PCI bus 123 and the host PCI bus 124. If the register for a function is zero, then multifunction PCI to PCI bridge interface chip 114 does not claim the configuration cycles on the local PCI bus 123 for that function.

FIG. 6 illustrates host configure device selection translation values for the functions of the multifunction PCI to PCI bridge interface chip 114 for exemplary interrupt routing of peripheral component interconnect (PCI) adapters via device address mapping in accordance with the preferred embodiment. FIG. 6 shows an exemplary bit breakdown for a mask used to translate device numbers between the local PCI bus 123 and the host PCI bus 124.

While the present invention has been described with reference to the details of the embodiments of the invention shown in the drawing, these details are not intended to limit the scope of the invention as claimed in the appended claims.

What is claimed is:

1. Apparatus for interrupt routing of peripheral component interconnect (PCI) adapters via device address mapping comprising:

a first processor complex; said first processor complex including a multifunction PCI to PCI bridge interface chip;

a second processor complex;

a local PCI bus coupled between said second processor complex and said multifunction PCI to PCI bridge interface chip;

a host PCI bus coupled between said multifunction PCI to PCI bridge interface chip and a second multifunction PCI to PCI bridge chip;

a plurality of PCI adapters coupled to said second multifunction PCI to PCI bridge chip; and said multifunction PCI to PCI bridge interface chip of said first processor complex including interrupt mapping logic for mapping interrupts from said PCI adapters to PCI interrupts on said local PCI bus.

2. Apparatus for interrupt routing of peripheral component interconnect (PCI) adapters as recited in claim 1 wherein said multifunction PCI to PCI bridge interface chip of said first processor complex includes translation logic for translating a configuration cycle on said local PCI bus from said second processor complex to another configuration cycle on said host PCI bus.

3. Apparatus for interrupt routing of peripheral component interconnect (PCI) adapters as recited in claim 2 wherein said translation logic of said multifunction PCI to PCI bridge interface chip of said first processor complex includes a bus number register to specify a bus number to be placed on said host PCI bus.

4. Apparatus for interrupt routing of peripheral component interconnect (PCI) adapters as recited in claim 3 wherein said a bus number register includes a predefined number of bits for each of a plurality of functions appearing as PCI to PCI bridges.

5. Apparatus for interrupt routing of peripheral component interconnect (PCI) adapters as recited in claim 2 wherein said translation logic of said multifunction PCI to PCI bridge interface chip of said first processor complex includes a device translation register.

6. Apparatus for interrupt routing of peripheral component interconnect (PCI) adapters as recited in claim 5 wherein said device translation register specifies a translation value for each function of said multifunction PCI to PCI bridge interface chip of said first processor complex for determining a device number of each of said plurality PCI adapters.

7. Apparatus for interrupt routing of peripheral component interconnect (PCI) adapters as recited in claim 1 wherein multifunction PCI to PCI bridge interface chip of said first processor complex includes translation logic for translating a configuration cycle on said host PCI bus to another configuration cycle on said local PCI bus to said second processor complex.

8. Apparatus for interrupt routing of peripheral component interconnect (PCI) adapters as recited in claim 1 wherein multifunction PCI to PCI bridge interface chip of said first processor complex includes a plurality of functions.

9. A method for interrupt routing of peripheral component interconnect (PCI) adapters in a system including a first processor complex including a multifunction PCI to PCI bridge interface chip and a second processor complex; a local PCI bus coupled between the second processor complex and the multifunction PCI to PCI bridge interface chip; a host PCI bus coupled between the multifunction PCI to PCI bridge interface chip and a second multifunction PCI to PCI bridge chip; and a plurality of PCI adapters coupled to the second multifunction PCI to PCI bridge chip said method comprising the steps of:

providing interrupt mapping logic and translation functions in the multifunction PCI to PCI bridge interface chip of said first processor complex, utilizing the multifunction PCI to PCI bridge interface chip, mapping interrupts from the PCI adapters to PCI interrupts on the local PCI bus to the second processor complex;

utilizing the multifunction PCI to PCI bridge interface chip of said first processor complex, translating device and bus numbers between the local bus and the host PCI bus.

10. A method for interrupt routing of peripheral component interconnect (PCI) adapters as recited in claim 9 wherein the step of translating device and bus numbers between the local bus and the host PCI bus includes the step of providing a device translation register in the multifunction PCI to PCI bridge interface chip of said first processor complex for specifying a translation value for each function of the multifunction PCI to PCI bridge interface for determining a device number of each of the plurality of PCI adapters.

11. A method for interrupt routing of peripheral component interconnect (PCI) adapters as recited in claim 9 wherein the step of translating device and bus numbers between the local bus and the host PCI bus includes the step of providing a bus number register in the multifunction PCI to PCI bridge interface chip of said first processor complex to specify a bus number to be placed on the first local PCI bus and the host PCI bus.

12. Apparatus for interrupt routing of peripheral component interconnect (PCI) adapters via device address mapping comprising:

a first processor complex; said first processor complex including a multifunction PCI to PCI bridge interface chip;

a second processor complex;

a local PCI bus coupled between said second processor complex and said multifunction PCI to PCI bridge interface chip;

a host PCI bus coupled between said multifunction PCI to PCI bridge interface chip and a second multifunction PCI to PCI bridge chip;

a plurality of PCI adapters coupled to said second multifunction PCI to PCI bridge chip;

said multifunction PCI to PCI bridge interface chip of said first processor complex including interrupt mapping logic for mapping interrupts from said PCI adapters to PCI interrupts on said local PCI bus; and said multifunction PCI to PCI bridge interface chip of said first processor complex including translation functions for translating device and bus numbers between the local bus and the host PCI bus.

* * * * *